United States Patent [19]
Kish

[11] 3,827,255
[45] Aug. 6, 1974

[54] MEANS FOR PREVENTING FLOW OF LUBRICANT-SATURATED REFRIGERANT IN AUTOMOTIVE AIR-CONDITIONING SYSTEMS

[75] Inventor: Arthur S. Kish, Lyndhurst, Ohio

[73] Assignee: Murray Corporation, Cockeysville, Md.

[22] Filed: Mar. 30, 1973

[21] Appl. No.: 346,589

[52] U.S. Cl................. 62/296, 62/323, 62/468, 251/368
[51] Int. Cl............................................. F25b 41/04
[58] Field of Search............ 62/468, 323, 296, 196, 62/510, 498; 251/368

[56] References Cited
UNITED STATES PATENTS

| | | | |
|---|---|---|---|
| 2,150,487 | 3/1939 | Brown | 62/468 X |
| 2,194,530 | 3/1940 | Torstensson | 62/498 X |
| 2,198,258 | 4/1940 | Money | 62/296 |
| 2,332,787 | 10/1943 | Fleming | 251/368 X |
| 2,497,668 | 2/1950 | Grumblatt | 62/296 X |
| 3,093,976 | 6/1963 | Walcutt | 62/509 X |

FOREIGN PATENTS OR APPLICATIONS

| | | | |
|---|---|---|---|
| 188,351 | 1/1957 | Germany | 62/296 |

*Primary Examiner*—William E. Wayner
*Attorney, Agent, or Firm*—William Isler

[57] ABSTRACT

A check valve is incorporated in an automotive air-conditioning system for preventing flow of the refrigerant through the system when a car is not in use, whereby to avoid migration of the lubricating oil with which the refrigerant is saturated, and consequent damage to the compressor of the system. The check valve is preferably in the form of a spring-pressed ball, and is disposed between the compressor and muffler. To facilitate assembly in this system, the valve is provided as a part of a muffler and hose assembly.

4 Claims, 6 Drawing Figures

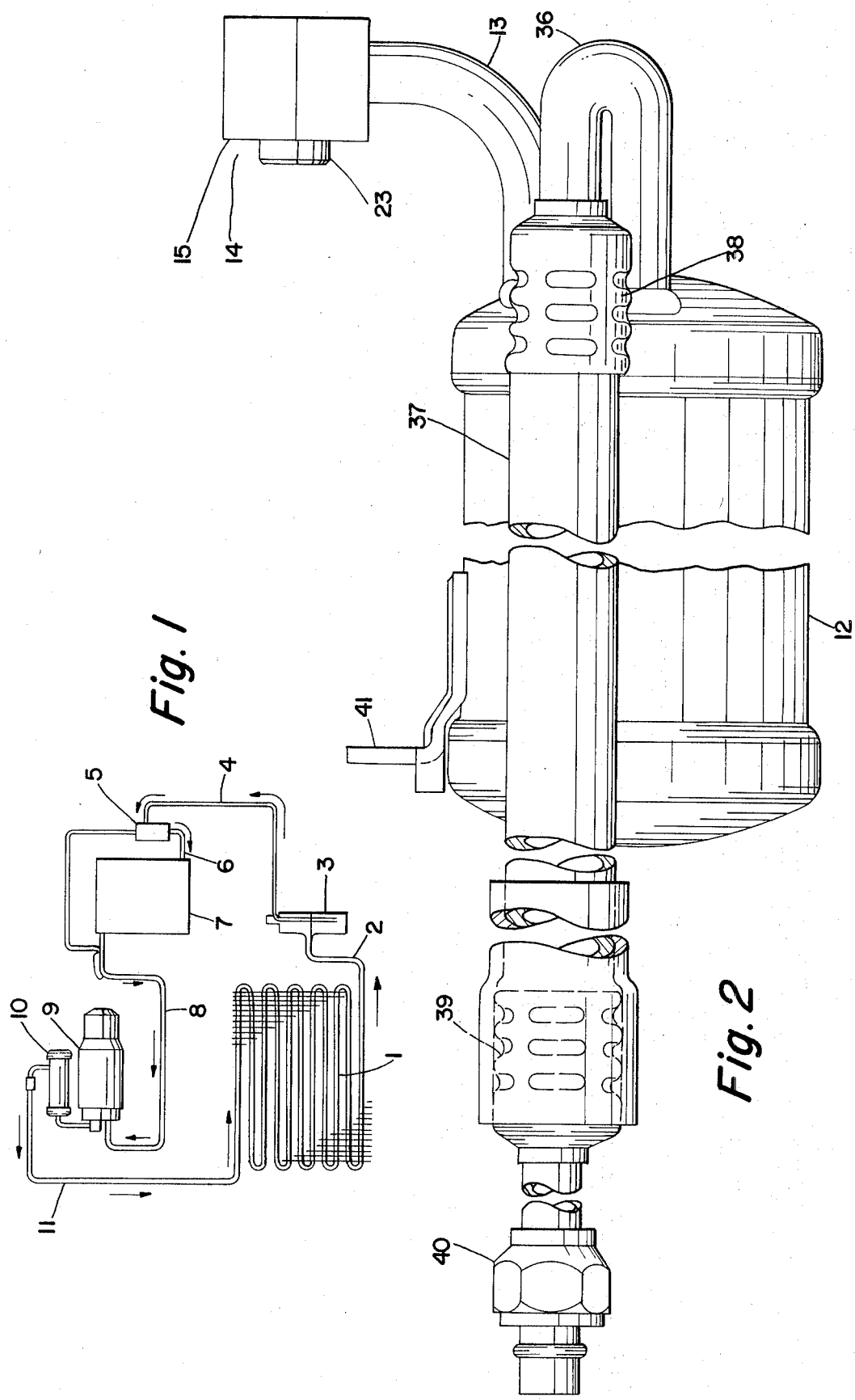

MEANS FOR PREVENTING FLOW OF LUBRICANT-SATURATED REFRIGERANT IN AUTOMOTIVE AIR-CONDITIONING SYSTEMS

This invention relates, as indicated, to means for preventing flow of lubricant-saturated refrigerant in automotive air-conditioning systems.

Automobiles are usually shipped by automobile manufacturers from the factory or assembly plants with the closed air-conditioning systems therein completely operative, that is to say, filled with a refrigerant, such as freon, and completely sealed against leakage of the refrigerant, at least theoretically so.

The refrigerant contains a fluid lubricant, so that as the refrigerant circulates through the system, all movable parts in the system, through which the refrigerant flows, and more particularly, the compressor, are lubricated.

It was discovered within the past year or so that all of the divisions of General Motors were experiencing compressor galling, burn-out, and in some cases, failure to turn over the compressors, causing damaged belts and new car warranty problems.

The primary reasons for this are that when the new cars are parked outdoors in their staging areas, and then shipped, as by rail or truck, throughout the United States, to their distribution areas, they are exposed to different ambient temperatures, i.e., temperatures of different ambient atmospheres. In the Southern part of the country, the air-conditioning system is exposed to high temperatures during the day and low temperatures during the night.

This ambient variation causes the system to flow the lubricant-laden refrigerant from the engine compartment through the passenger compartment, and this causes the oil or lubricant in the refrigerant to be washed out of the compressor, and the droplets of oil (lubricant) to be deposited or precipitated in low spots or areas in the system which are lower then the compressor, from which they cannot be readily redistributed in the refrigerant, when the air-conditioning system is placed in operation by the owner or driver of the car. As a result, the interior of the compressor can be bone dry (of lubricant), causing the galling, burn-out or failure to which reference has been made.

The POA valve in the system (see Pat. No. 3,612,096) was, in a sense, supposed to stop this unwanted flow of the refrigerant, but the clearance between the piston and cylinder of the POA valve was apparently too large to stop this flow.

The present invention has as its primary object the provision of means for preventing flow of lubricant-saturated refrigerant in an automotive air-conditioning system at times and during periods when such flow is not desired.

Another object of the invention is to provide spring-loaded valve means which will prevent such flow of refrigerant except above predetermined pressures sufficient to open the valve.

A further object of the invention is to provide a muffler assembly for an automotive air-conditioning system having incorporated therein, as a part of the assembly, valve means of the character described.

A further object of the invention is to provide a hose and muffler assembly for an automotive air-conditioning system, having incorporated therein, as a part of the assembly, valve means of the character described.

A further object of the invention is to provide valve means of the character described, which can be built into a compressor of an automotive air-conditioning system.

A still further object of the invention is to provide a check valve of novel construction adapting it especially for the purposes of this invention.

Other objects and advantages of my invention will be apparent during the course of the following description.

In the accompanying drawings forming a part of this specification, and in which like numerals are employed to designate like parts throughout the same, FIG. 1 is a view illustrating, in a more or less diagrammatic manner, a conventional or typical closed air-conditioning system of an automobile or like vehicle;

FIG. 2 is an elevational view of a hose and muffler assembly, embodying the invention, and including the valve of the invention;

Figure 3:
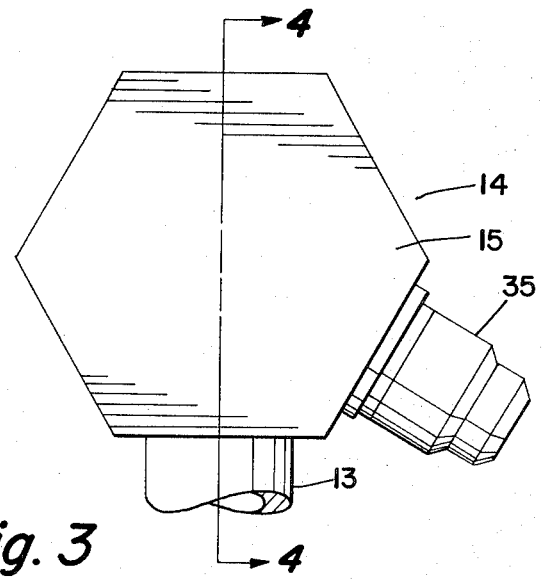
FIG. 3 is an end elevational view, on an enlarged scale, of the ball or check valve.
Figure 4:
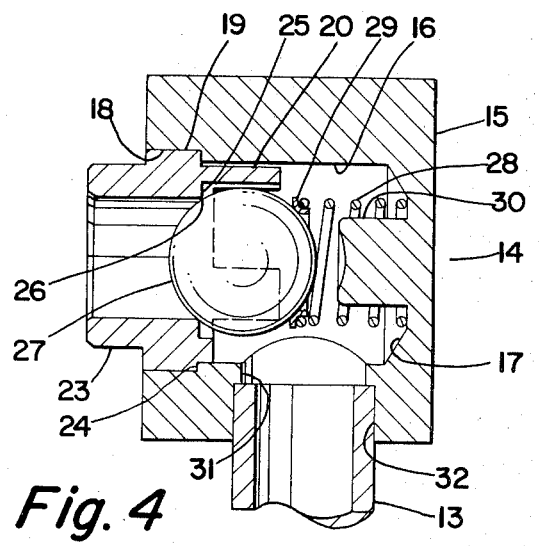
FIG. 4 is a cross-sectional view, taken on the line 4—4 of FIG. 3.
Figure 5:
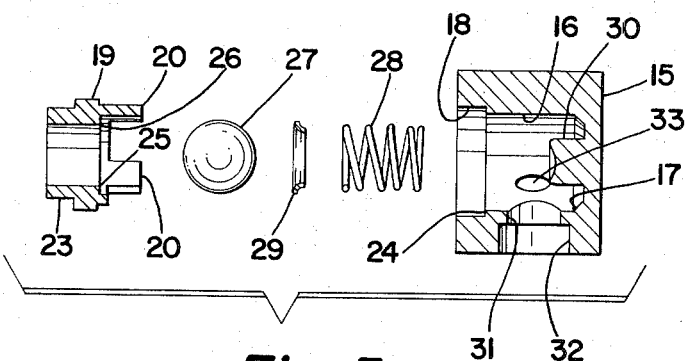
FIG. 5 is an exploded view of the parts of the valve of FIGS. 3 and 4.

Referring more particularly to FIG. 1 of the drawings, a conventional automobile air conditioning system is shown, in somewhat diagrammatic fashion, comprising a condenser 1, a conduit 2, a receiver-drier or receiver-dehydrator 3, a conduit 4, a thermostatic expansion valve 5, a conduit 6, an evaporator 7, a conduit 8, a compressor 9, a muffler 10, and a conduit 11, which leads back to the condenser. The arrows in this diagram indicate the direction of flow of the refrigerant, and the compressor is driven from the automobile engine by means of a belt or other means (not shown). The muffler 10 is a hollow tubular device designed to minimize compressor thumping sounds transmitted to the inside of the car.

The compressor 9 pumps heat-laden refrigerant, such as Freon, from the evaporator 7, compresses the refrigerant and passes it, under high pressure, to the condenser 1 as a superheated vapor.

Since the high pressure vapor delivered to the condenser is much hotter than the surrounding air, it gives up its heat to the outside air flowing through the condenser fins, and as it gives up its heat, it changes to a liquid.

The condensed liquid refrigerant is filtered, dried, and temporarily stored, under pressure, in the receiver drier 3 until it is needed by the evaporator 7.

The liquid refrigerant is metered from the receiver-drier 3 into the evaporator 7 by the thermostatic expansion valve 5, which controls the flow of refrigerant in this part of the system. The pressure of the refrigerant is lowered by the expansion valve and the refrigerant commences to boil, or change to a vapor. In doing so, it must pick up heat from the warm air passing through the fins of the evaporator 7 and this heat is transmitted, via the compressor 9, to the condenser 1, to be dissipated.

The present invention is concerned more particularly with the provision of a hose and muffler assembly having incorporated therein, as a part thereof, a ball check valve, the function of which will be presently explained.

The hose and muffler assembly including the ball check valve, is shown in FIGS. 2 to 6 of the drawings.

The hose and muffler assembly comprises a muffler 12, which corresponds to the muffler 10 of FIG. 1, and is provided at one end with a conduit 13, which is welded to the muffler and which, in turn, is connected to a ball check valve generally designated by reference numeral 14.

The check valve 14 comprises a block 15 of hexagonal external conformation having a cylindrical axial bore 16 which is closed at one end of the block to provide an annular seat 17.

The bore 16 is counterbored at its other end, as at 18, to receive the body 19 of a ball guide having at one end three circumferentially-spaced fingers 20, which extend into the bore 16, and at the other end a tubular extension 23 of reduced diameter, the function of which will be presently explained.

The junction of the bore 16 and counterbore 18 provides an annular shoulder 24 which forms a stop for determining the rearmost position of the body 19 of the ball guide when the body is slidably fitted into the counterbore 18.

An annular shoulder 25 is provided at the junction between the base of the guide fingers 20 and the body 19 of the ball guide, the inner periphery of this shoulder forming a seat 26 for a ball 27, which is preferably a ball of one-half inch diameter made of Buna N rubber of 92/96 Durometer grade, which is resistant to Freon and the lubricating oil which is contained in the Freon.

The ball 27 is normally retained against its seat 26 by means of a coil spring 28, which is interposed between the annular seat 17 of the block 15 and an annular seat member 29, which is designed to prevent marking of the ball 27 of the spring 28.

The block 15 is provided with a portion 30 which extends axially into the bore 16 and serves to retain the spring 28 against displacement in a direction laterally of the axis of the bore.

The block 15 is also provided with a bore 31 which extends radially from the bore 16 and is counterbored, as at 32, for the reception of the conduit 13 which extends from one end of the muffler 12.

The block 15 is further provided with a bore 33, the axis of which extends radially from the bore 16 and which is normally closed by a closure cap 35.

The muffler 12 has welded to the end thereof to which the conduit 13 is connected, a conduit 36 to which a rubber hose 37 is connected, as by a coupling 38. The other end of the hose 37 is connected, as by a coupling 39, to a nut 40, which is connected to a conduit (not shown) corresponding to the conduit 11 in FIG. 1.

The muffler 12 is also provided with an angle bracket 41 which is adapted to be secured to the compressor 9 in a manner such that the muffler is disposed in spaced generally parallel relationship with the muffler.

The hose and muffler assembly comprises all of the parts 12 to 41 inclusive, including the ball check valve. In other words, this assembly is intended to be sold as a unit for installation in an air-conditioning system of the type shown or similar to that shown in FIG. 1.

Figure 6:
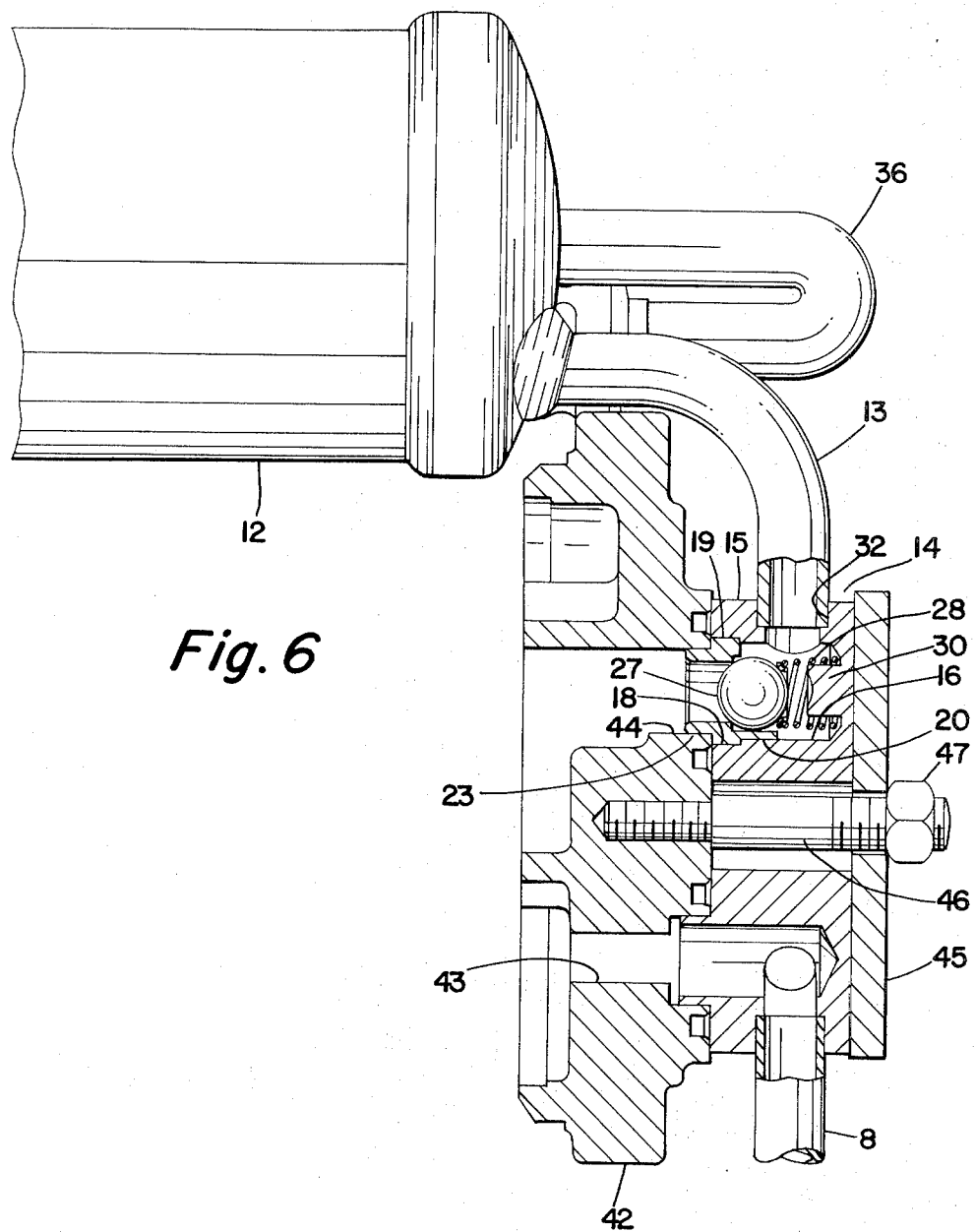
FIG. 6 is a fragmentary view, partly in elevation and partly in section, showing the manner in which the valve of the present invention can be incorporated or built into a compressor.

In FIG. 6, there is disclosed a method whereby the check valve which has been described may be installed on the back plate of a compressor of a type used by General Motors, reference being had, in this connection, to my U.S. Pat. No. 3,496,599.

In FIG. 6, reference numeral 42 designates the back plate of a compressor, said back plate having an inlet passageway 43 for passage of the refrigerant into the compressor through conduit 8, and having an outlet passageway 44 for passage of the fluid refrigerant into the muffler 12 through the conduit 13.

The valve 14 of the present invention is clamped to the plate 42 by means of a clamp bar 45, which, in turn, is secured to the plate 42 by means of a stud 46 and nut 47. In thus clamping the valve 14 to the plate 42, the tubular extension 23 of the body 19 of the ball guide extends into the passageway 44.

The operation of the valve 14 may be described briefly as follows:

If the automobile engine is shut off, and the car parked anywhere, the refrigeration or air-conditioning system will seek equilibrium pressure, so that irrespective of the ambient temperature or pressure, the check valve pressure will always be 10 pounds greater than the ambient pressure, and will thus positively shut off the unwanted flow of the lubricant-laden refrigerant through the system. Consequently, the oil or lubricant in the refrigerant will have no opportunity to settle or precipitate into low areas of the system, and lubrication of the compressor is always maintained.

When the car engine is started, and the refrigeration system is in operation, the pressure of the refrigerant in the compressor immediately builds up to a pressure sufficient to open the valve.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a closed automotive air-conditioning system, utilizing a lubricant-laden refrigerant, the combination of a compressor, a muffler in spaced relation to said compressor, a conduit interconnecting said compressor and muffler, and valve means independent of the compressor and interposed between said compressor and muffler, said valve means comprising a ball valve biased into closed position by biasing means set to open at approximately 10 pounds to prevent flow of the refrigerant through the system when the automobile engine is not in operation, and being openable at the predetermined pressure of the refrigerant in the compressor to permit flow of the refrigerant through the system.

2. The system, as defined in claim 1, wherein the ball valve is non-metallic.

3. The sytem, as defined in claim 2, wherein the ball valve is synthetic rubber.

4. The system, as defined in claim 3, wherein the biasing means is a coil spring.

* * * * *